United States Patent
Caballero et al.

(10) Patent No.: US 8,538,063 B2
(45) Date of Patent: Sep. 17, 2013

(54) SYSTEM AND METHOD FOR ENSURING THE PERFORMANCE OF A VIDEO-BASED FIRE DETECTION SYSTEM

(75) Inventors: Rodrigo E. Caballero, Crystal Lake, IL (US); Alan Matthew Finn, Hebron, CT (US); Pei-Yuan Peng, Ellington, CT (US); Ziyou Xiong, Wethersfield, CT (US); Hongcheng Wang, Vernon, CT (US)

(73) Assignee: UTC Fire & Security, Farmington, CT (US)

( * ) Notice: Subject to any disclaimer, the term of this patent is extended or adjusted under 35 U.S.C. 154(b) by 421 days.

(21) Appl. No.: 12/736,750

(22) PCT Filed: May 8, 2008

(86) PCT No.: PCT/US2008/005964
§ 371 (c)(1),
(2), (4) Date: Nov. 5, 2010

(87) PCT Pub. No.: WO2009/136894
PCT Pub. Date: Nov. 12, 2009

(65) Prior Publication Data
US 2011/0051993 A1    Mar. 3, 2011

(51) Int. Cl.
*G06K 9/00* (2006.01)
*G06K 9/46* (2006.01)

(52) U.S. Cl.
USPC ............................. 382/100; 382/190; 382/195

(58) Field of Classification Search
USPC .......................................... 382/190, 195, 100
See application file for complete search history.

(56) References Cited

U.S. PATENT DOCUMENTS

| | | | | |
|---|---|---|---|---|
| 5,153,722 A * | 10/1992 | Goedeke et al. | ............. | 348/159 |
| 6,184,792 B1 * | 2/2001 | Privalov et al. | ............... | 340/578 |
| 6,838,988 B2 * | 1/2005 | Lennartz et al. | ......... | 340/539.26 |
| 7,729,510 B2 * | 6/2010 | Zakrzewski et al. | .......... | 382/100 |
| 7,859,419 B2 * | 12/2010 | Shen-Kuen et al. | .......... | 340/628 |
| 7,868,772 B2 * | 1/2011 | Chao et al. | .................... | 340/578 |
| 2005/0069207 A1 | 3/2005 | Zakrzewski et al. | | |
| 2006/0215904 A1 | 9/2006 | Ibrahim et al. | | |
| 2006/0253345 A1 | 11/2006 | Heber | | |
| 2008/0036593 A1 * | 2/2008 | Rose-Pehrsson et al. | .... | 340/540 |

OTHER PUBLICATIONS

Cleary et al. "Evaluation of Fire Detection Technology for Suitability in Aircraft Cargo Compartments" Int. Aircraft Fire and Cabin Safety Research Conf., Nov. 16-20, 1998.*
Gottuk et al. "An Initial Evaluation of Video-based Fire Detection Technologies" Jan. 9, 2004.*
Official Search Report and Written Opinion in counterpart foreign Application No. PCT/US2008/005964, filed May 8, 2008.

* cited by examiner

*Primary Examiner* — Utpal Shah
(74) *Attorney, Agent, or Firm* — MH2 Technology Law Group, LLP

(57) ABSTRACT

A video-based fire detection system receives video data comprised of a plurality of individual frames, and determines based on the video data the ability of the system to detect the presence of fire. The system includes a video recognition system connectable to receive the video data and to calculate one or more background features associated with the video data. Based on the calculated background features, the video recognitions system assesses the ability of the video-based fire detection system to detect the presence of fire. The system includes one or more outputs operably connectable to communicate the results of the assessment made by the video recognitions system.

18 Claims, 5 Drawing Sheets

SYSTEM AND METHOD FOR ENSURING THE PERFORMANCE OF A VIDEO-BASED FIRE DETECTION SYSTEM

BACKGROUND

The present invention relates generally to computer vision and pattern recognition, and in particular to methods of assessing the ability of a video-based system to detect the presence of fire.

The ability to detect the presence of fire is important on a number of levels, including with respect to human safety and the safety of property. In particular, because of the rapid expansion rate of a fire, it is important to detect the presence of a fire as early as possible. Traditional means of detecting fire include particle sampling (i.e., smoke detectors) and temperature sensors. While accurate, these methods include a number of drawbacks. For instance, traditional particle or smoke detectors require smoke to physically reach a sensor. In some applications, the location of the fire or the presence of ventilated air systems prevents smoke from reaching the detector for an extended length of time, allowing the fire time to spread. A typical temperature sensor requires the sensor to be located physically close to the fire, because the temperature sensor will not sense a fire until it has spread to the location of the temperature sensor. In addition, neither of these systems provides as much data as might be desired regarding size, location, or intensity of the fire.

A video-based fire detection system provides solutions to some of these problems. In particular, video-based systems can detect the presence of fire prior to physical evidence of the fire (e.g., smoke particles) reaching the video detector. However, the video-based fire detection system presents challenges not encountered in traditional sensors. For instance, the ability of a video-based system to detect the presence of fire depends, in part, on the environment in which the video detector is operating. In addition, problems associated with video quality degradation may inhibit the ability of the system to accurately detect the presence of fire.

For these reasons, it would be beneficial to develop a method of assessing the ability of a video-based system to accurately detect the presence of fire.

SUMMARY

Described herein is a method of initializing a video-based fire detection system to detect the presence of fire. The method includes acquiring video data comprised of individual frames from a video detector and calculating background features associated with one or more of the individual frames. Based on the calculated background features, the method assesses the ability of the video-based fire detection system to detect the presence of fire. An output is generated that indicates the ability of video-based fire detection system to detect the presence of fire.

Another embodiment of the present invention describes a method of monitoring the ability of video-based fire detection system to detect the presence of fire. The method includes calculating video-quality features associated with individual frames during operation of the video-based fire detection system. The method further includes detecting video quality degradation that adversely affects the ability of video-based fire detection system to detect the presence of fire based on the calculated video quality features. In response, an output is generated that indicates the assessed ability of the video-based fire detection system to detect the presence of fire.

Another embodiment describes a video-based fire detection system that includes one or more inputs operably connectable to receive video data comprised of a plurality of individual frames from one or more video detectors. The video-based fire detection system includes a video recognition system connectable to receive the video data and to provide an output assessing the ability of the video recognition system to detect the presence of fire. In particular, the video recognition system calculates one or more background features associated with each individual frame, and assesses the ability of the video-based fire detection system to detect the presence of fire based on the calculated background features. The system also includes outputs operably connectable to indicate the ability of the video recognition system to detect the presence of fire.

DETAILED DESCRIPTION

The present invention describes a system and method for analyzing the ability of a video-based fire detection system to detect the presence of fire. For instance, the present invention may be used during installation of the video-based fire detection system to assess the ability of the system to detect the presence of fire. The analysis may include computing many of the same features used by the video-based system in detecting the presence of fire, and analyzing these features to determine whether based on the environment in which the video detector is operating, the video-based fire detection system will be capable of detecting the presence of fire. For instance, in situations in which the background includes very little color (e.g., in a tunnel), there may be insufficient color data available to detect the presence of fire (in particular, the presence of smoke). By providing feedback at the installation stage, steps can be taken to modify the orientation of the camera, or the overall background to improve the ability of the video-based fire detection system to detect the presence of fire.

In addition, the present invention may be used to assess the ability of video-based fire detection system to detect the presence of fire during the operational stage (i.e., after installation), in which the system is actively being used to detect the presence of fire. During this stage, analysis is performed on the acquired video input to detect video quality degradation that inhibits the ability of video-based fire detection system to detect the presence of fire. For example, if the video detector becomes out of focus over time, then the video input provided by the video detector may be sufficiently blurry to prohibit the video-based fire detection system from detecting the presence of fire. By automatically monitoring the quality of the video input provided for analysis, problems associated with the video data may be identified and corrected.

Throughout this description, the term fire is used broadly to describe the presence of flame and/or smoke. Where appropriate, specific embodiments are provided that describe the detection of either flame or smoke.

Figure 1:
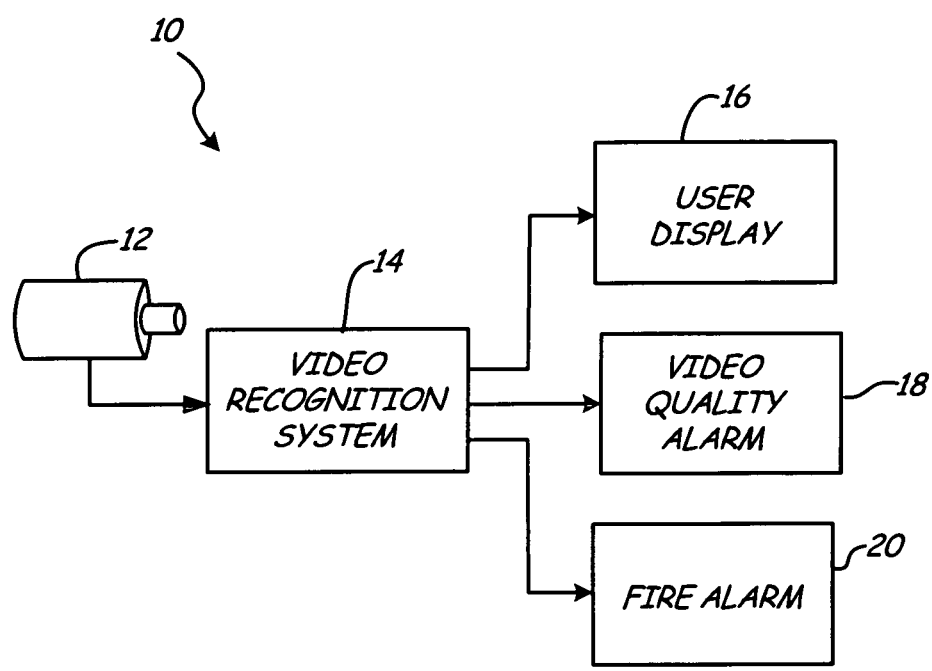
FIG. 1 is a block diagram of an exemplary embodiment of a video-based fire detection system of the present invention, including video detectors, a video recognition system, and a plurality of outputs.

FIG. 1 is a block diagram illustrating an exemplary embodiment of video-based fire detection system 10, which includes at least one video detector 12, video recognition system 14, and one or more of a plurality of outputs, including user display 16, video quality alarm 18, and fire alarm 20. Video images captured by video detector 12 are provided to video recognition system 14. The provision of video by video detector 12 to video recognition system 14 may be by any of a number of means, e.g., by a hardwired connection, over a shared wired network, over a dedicated wireless network, over a shared wireless network, etc. Hardware included within video recognition system 14 includes, but is not limited to, a video processor as well as memory. Software included within video recognition system 14 includes video content analysis software capable of performing the functions illustrated. The provision of signals by video recognition system 14 to user display 16, video quality alarm 18, or fire alarm 20 may be by any of a number of means, e.g., by a hardwired connection, over a shared wired network, dedicated wireless network, over a shared wireless network, etc.

Video detector 12 may be a video camera or other type of video data capture device. The term video input is used generally to refer to video data representing two or three spatial dimensions as well as successive frames defining a time dimension. In an exemplary embodiment, video input is defined as video input within the visible spectrum of light. However, the video detector 12 may be broadly or narrowly responsive to radiation in the visible spectrum, the infrared spectrum, the ultraviolet spectrum, or combinations of these broad or narrow spectral frequencies.

During operation of video-based fire detection system 10, video recognition system 14 employs computer vision techniques to analyze the video data provided by video detector 12. A variety of computer vision techniques are well-known in the art and may be employed alone or in combination to detect the presence of fire. In the event video recognition system 14 determines that the video data indicates the presence of smoke and/or flames, video recognition system 14 generates an output that triggers fire alarm 20.

In addition to the traditional computer vision techniques employed by video-based fire detection systems, the present invention includes computer vision techniques employed to assess the ability of video-based fire detection system 10 to accurately detect the presence of a fire. Results of the analysis are provided to user display 16 and/or video quality alarm 18. In particular, during the installation stage, results of the analysis performed by video recognition system 14 are provided to user display 16 to allow a technician to determine in real-time the effectiveness of video-based fire detection system 10. During the operational stage, results of the analysis performed by video recognition system 14 may also be provided to user display 16. In addition, if analysis of the video data indicates the presence of video quality degradation, then video recognition system 14 generates an output that triggers video quality alarm 18.

Figure 2:
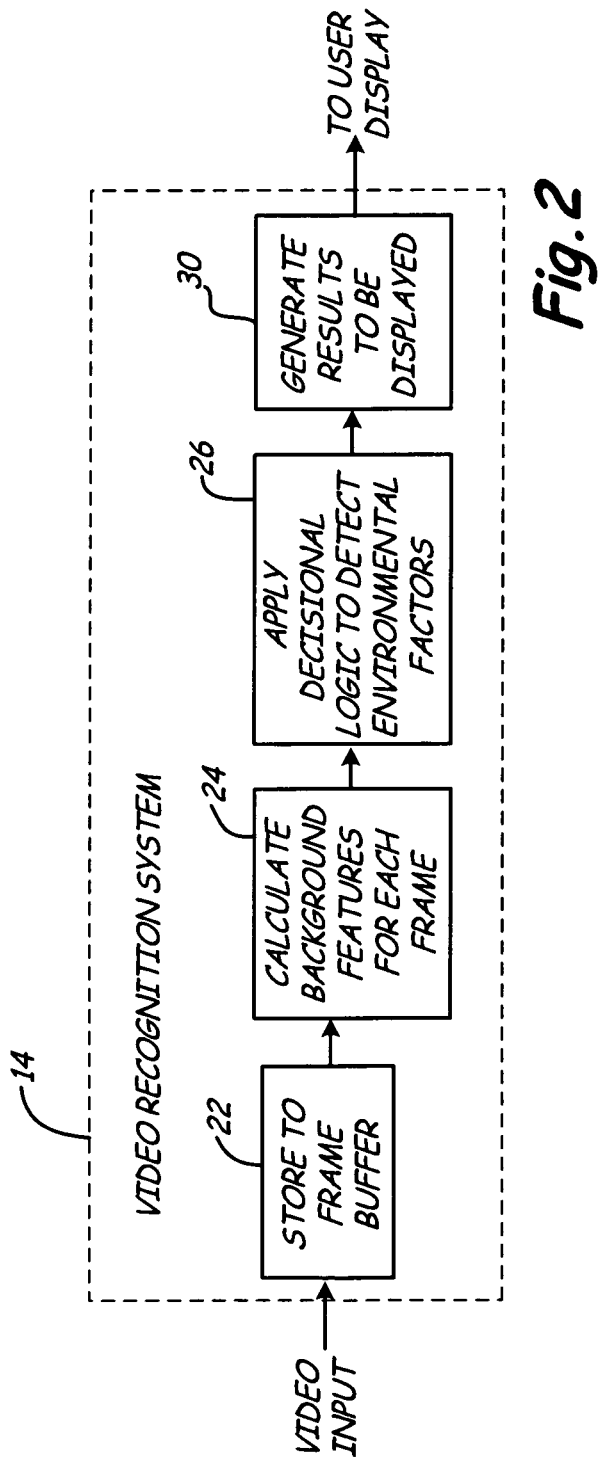
FIG. 2 is a block diagram of functions performed by the video recognition system in assessing the ability of the video-based fire detection system to detect the presence of fire.

FIG. 2 is a block diagram illustrating functions performed by video recognition system 14 in analyzing video data to assess the ability of video-based fire detection system 10 to detect the presence of fire. Video recognition system 14 includes a combination of hardware and software necessary to perform the functional steps shown within video recognition system 14.

In an exemplary embodiment, the functions shown in FIG. 2 are performed during installation of video-based fire detection system 10 to detect any environmental factors that may adversely affect the ability of the system to detect the presence of fires. The functions described with respect to FIG. 2 (as well as those described with respect to FIG. 5) are in addition to functions typically performed by video recognition system 14 in analyzing video data to detect the presence of fire. Although there may be overlap between the features calculated to detect the ability of the system to detect fire, and features calculated to actually detect the presence of fire, for the sake of simplicity the functions described with respect to assessing the ability of video-based system 10 to detect fire are described as a stand-alone system.

Functions performed with respect to FIG. 2 include storing video frames to a buffer (step 22), calculating background features associated with each frame (step 24), applying decisional logic to the calculated background features to determine the ability of video-based fire detection system 10 to detect the presence of fire (step 26), and generating results to be displayed to a user (step 28).

At step 22, frames of video data provided by video detector 12 are stored to a buffer. The frame buffer may retain one frame, every successive frame, a subsampling of successive frames, or may only store a certain number of successive frames for periodic analysis. The frame buffer may be implemented by any of a number of means including separate hardware or as a designated part of a video capture card or computer memory.

At step 24, one or more "background features" are calculated with respect to each frame of video data. The term "background feature" is used generally to refer to features that characterize the environment within the field of view of the video detector. In an exemplary embodiment, video recognition system 14 calculates one or more background features characterizing the color content, spatial frequency content, edge content, motion-based content, illumination content, contrast content, and combinations thereof generated with respect to the video data. These features may also be employed by video recognition system 14 during the operational stage to detect the presence of fire. During this stage, however, these features are employed to determine whether the video-based fire detection system is capable of detecting the presence of fire in light of the environmental or background features. In addition, during the installation stage, features associated with the quality of the video data may also be generated for analysis (as described with respect to FIG. 5), but in general a technician or installer of the video-based fire detection system will be capable of manually assessing the quality of the video data upon installation. For purposes of this description, the features used to assess the ability of the video-based fire detection system to detect the presence of fire at installation are described as background features.

For example, color-based features and edge-based features are commonly used, to detect the presence of smoke. In particular, color-based features are often used to detect the presence of "turbulent smoke". Video recognition system 14 calculates one or more color-based features to monitor the color content associated with a particular area, and looks for a characteristic loss of color indicative of the presence of smoke. In environments in which the background lacks color, the color-based features calculated at step 24 can be used to assess whether based on the lack of color, the algorithms typically employed by video recognition system 14 to detect the presence of smoke will be successful.

Edge-based features are also commonly employed to detect the presence of smoke. In particular, edge-based features are often used to detect the presence of "obscuring smoke." Video recognition system 14 may calculate one or more edge-based features. Once again, video recognition system 14 analyzes the edge-based features for a loss or degradation of edge-based data indicative of the presence of smoke. In environments in which the background lacks defined edges, the edge-based features calculated at step 24 can be used to assess whether based on the lack of edge data, algorithms typically employed by video recognition system 14 to detect the presence of smoke will be successful. These features, as well as others, may be similarly employed to assess the ability of video recognition system 14 to accurately detect the presence of flame. Background features may be represented as a singular value, or may be represented as a distribution that can be used in analyzing the background content.

At step 26, the background features are analyzed by decisional logic to assess the ability of video-based fire detection system to detect the presence of fire. For example, with respect to color-based features, a determination is made whether the background includes sufficient color to allow video recognition system 14 to detect the presence of fire. With respect to edge-based features, a determination is made whether the background includes sufficient edge content to allow video recognition system 14 to detect the presence of fire. Analysis of the background features at step 26 may include analysis of each feature independently, or may include analysis of the background features in combination, to determine whether the combination of available features can be used to accurately detect the presence of fire.

In an exemplary embodiment, the decisional logic employed at step 26 compares the calculated background features to thresholds or constraints to assess the ability of video-based fire detection system 10 to detect the presence of fire. This may include comparing the calculated background features to thresholds defining minimum background feature requirements for the detection of fire (including different thresholds for the detection of flame and smoke, respectively) as well as additional thresholds that may be used to define various levels of capability associated with the ability of the video-based fire detection system 10 to detect the presence of fire. Decisional logic may be implemented with a variety of well-known classifiers or algorithms, including fuzzy-based inference systems, training-based systems, neural networks, support vector systems, or other well-known classifiers.

At step 30, an output is generated in response to the analysis performed at steps 24 and 26. In an exemplary embodiment, the output may be a binary output indicating whether, based on the background features extracted, video recognition system 14 is capable of detecting the presence of fire. In other exemplary embodiments, the output is more detailed, providing a technician or operator with additional information regarding the ability of video recognition system 14 to detect the presence of fire. For example, the output may be graphical in nature, illustrating an assessment of the ability of video-based fire detection system to detect the presence of fire within each area of the field of view of video detector 12. In another example, the output is real valued and represents the certainty or the ability of video recognition system 14 to detect the presence of fire. For instance, the real-valued output may be a percentage indicating the certainty with which the video-based fire detection system can be expected to detect the presence of fire. In another example, the output includes recommendations on how to improve the ability of fire detection system 10 to detect the presence of fire. For example, recommendations may relate to the orientation and/or position of the camera as well as recommendations regarding physically modifications that may be made to the background to improve the ability of video-based fire detection system 10 to detect the presence of fire.

Figure 3A:
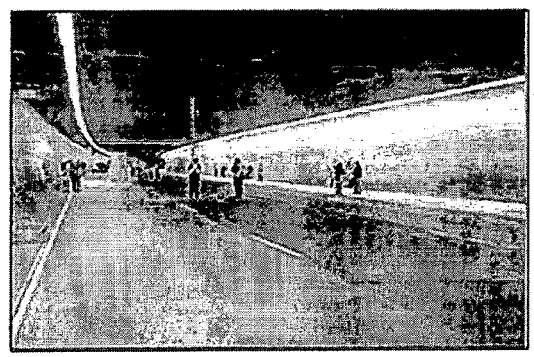
FIGS. 3A and 3B are sample images illustrating the result of analysis performed by the video recognition system in assessing the ability of video-based fire detection system to detect the presence of fire.
Figure 3B:
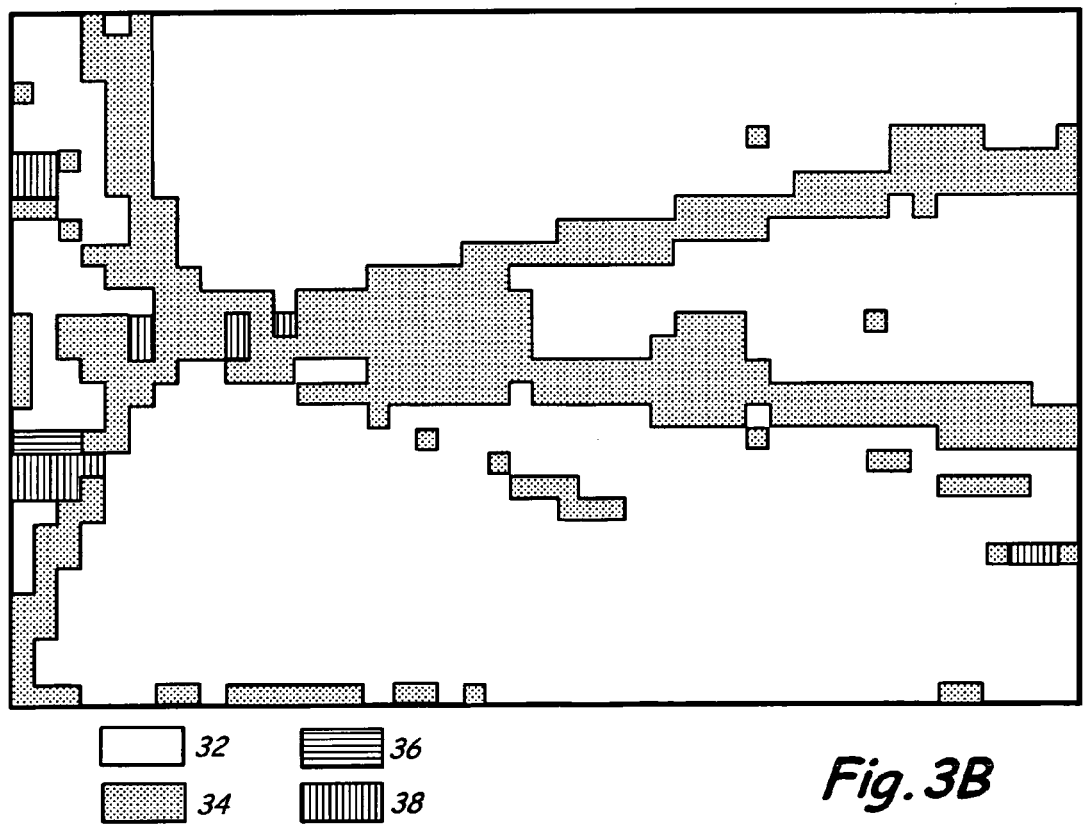

FIGS. 3A and 3B are examples illustrating analysis performed by video recognition system 14 in assessing the ability of the video-based fire detection system to detect the presence of fire (in particular, smoke). In particular, FIG. 3A is a sample image received from a video detector, and FIG. 3B is the resulting output generated by video recognition system 14 illustrating the ability of the video-based fire detection system to detect the presence of fire.

In this example, the video detector is positioned to monitor a tunnel as shown in FIG. 3A. In FIG. 3B, the resulting analysis generated by video recognition system 14 identifies regions that have insufficient edge and color content (illustrated by region 32), regions that have sufficient edge content (illustrated by cross-hatched region 34), regions that have sufficient color content (illustrated by cross-hatched region 36), and regions that have sufficient edge and color content (illustrated by cross-hatched region 38).

The display presented to a user may be color-coded to alert the user to the status of a particular region within the field of view of the video detector. For example, regions determined to contain insufficient edge and color content (e.g., region 32) may be displayed to the user with a first color. Regions having sufficient edge content (e.g., region 34) or sufficient color content (e.g., region 36) may each be displayed with different color(s), and areas in which video recognition system 14 is unable to determine whether there is regions in which both the edge content and the color content is sufficient (e.g., region 38) may be displayed with yet another color.

As a result of the analysis performed by video recognition system 14, some regions (e.g., region 32) may be identified as lacking the background features necessary to detect the presence of fire (i.e., fire detection system 10 will be unable to detect the presence of fire). Other regions (e.g., regions 34 and 36) may be identified as having a reduced capability to detect the presence of fire. For instance, region 34 lacks sufficient color content to detect the presence of fire, but does provide sufficient edge content to detect the presence of fire. In particular, due to the lack of color content in region 34, video-based fire detection system 10 may be unable to detect the presence of turbulent smoke indicative of fire. Region 34 may therefore be classified as providing a reduced or somewhat diminished ability to detect the presence of fire. Likewise, region 36 lacks sufficient edge content to detect the presence of fire, but does provide sufficient color content to detect the presence of fire. In particular, due to the lack of edge content in region 36, video-based fire detection system 10 may be unable to detect the presence of obscuring smoke indicative of fire. Once again, region 36 may be classified as providing a reduced or somewhat diminished ability to detect the presence of fire.

In this particular example, analysis indicates that large areas of the tunnel (illustrated by region 32) have relatively little edge or color content that can be used to detect the presence of fire. Based on the output generated by video recognition system 14, steps can be taken to either re-orient the video detector to locate a background having sufficient edge or color content or physically alter the background to add additional edge or color content to those areas identified as insufficient. In the example shown in FIGS. 3A and 3B, reflective lines may be added to portions of the background identified as having insufficient edge content.

Figure 4A:
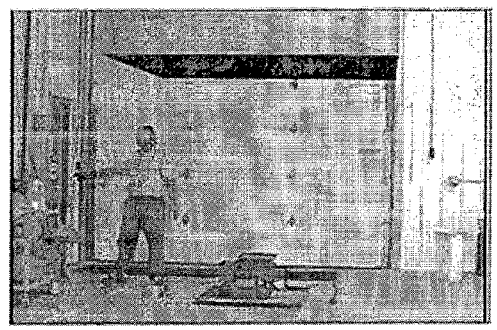
FIGS. 4A and 4B are sample images illustrating the result of analysis performed by video recognition system in assessing the ability of video-based fire detection system to detect the presence of fire.
Figure 4B:
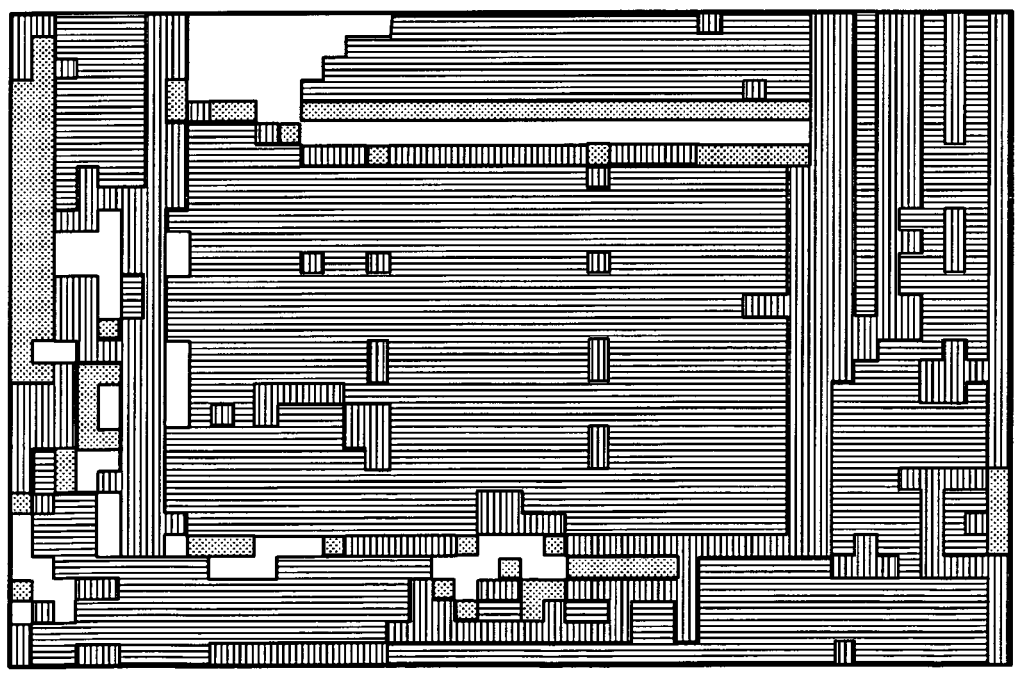
Figure 4B:
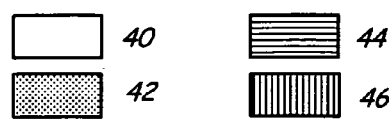

FIGS. 4A and 4B illustrate another example of analysis performed by video recognition system 14 in assessing the ability of the video-based fire detection system to detect the presence of fire. In this example, regions identified by video recognition system 14 as containing insufficient color and edge content are illustrated by cross-hatched region 40, regions identified as containing sufficient edge content are illustrated by cross-hatched region 42, regions identified as containing sufficient color content are illustrated by cross-hatched region 44, and regions identified as containing both sufficient color and sufficient edge content are illustrated by cross-hatched region 46. Based on the output generated by video recognition system 14, steps can once again be taken to either re-orient the video detector to locate a background having sufficient color content or physically alter the background to add additional color content to those areas identified as insufficient. In this example, significant portions of the background do contain significant color content and/or sufficient edge content. In addition to the graphical output indicating the sufficiency of the color content and the edge content in the background, video recognition system 14 may also generate a value representing the certainty or the ability of video recognition system to detect the presence of fire.

Figure 5:
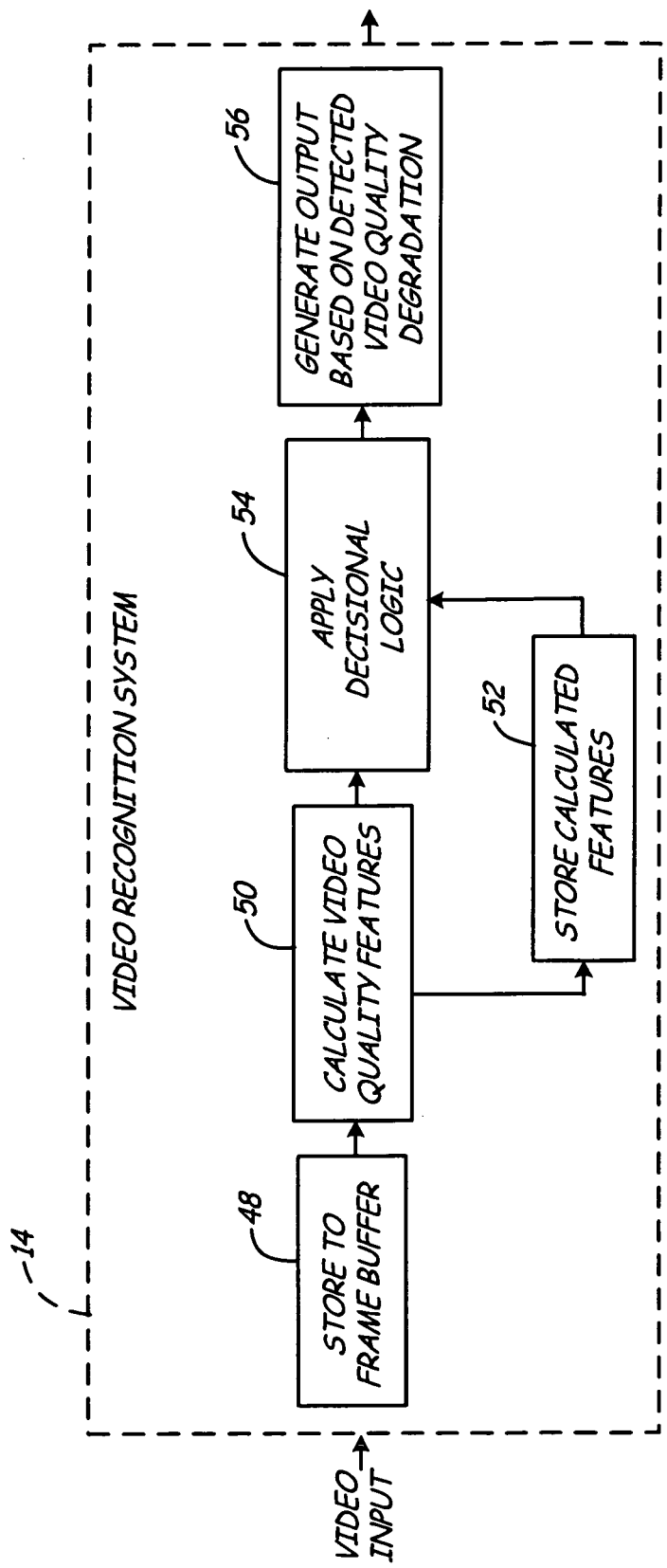
FIG. 5 is a block diagram illustrating functions performed by the video recognition system to monitor the quality of video data provided by the video detectors.

FIG. 5 is a block diagram illustrating functions performed by video recognition system 14 to automatically monitor the quality of the video data provided by video detector 12 in assessing the ability of video-based fire detection system 10 to detect the presence of fire. In this way, video recognition system 14 continually monitors the quality of the video data provided by video detectors 12 and automatically detects video quality degradation. In particular, video recognition system 14 calculates features that indicate a decreased ability of video-based fire detection system 10 to detect the presence of fire. In response to a determination that the ability of video-based fire detection system to detect the presence of fire has degraded, a notification signal or alarm is triggered to alert supervisors of the system.

In the embodiment shown in FIG. 5, functions performed by video recognition system 14 include storing video frames to a buffer (step 48), calculating video quality features associated with each frame (step 50), optionally storing one or more of the video quality features calculated with respect to each frame (step 52), applying decisional logic to detect video quality degradation that may adversely affect the ability to detect the presence of fire (step 54), and generating results to be displayed to a user (step 56).

At step 48, frames of video data provided by video detector 12 are stored to a buffer. The frame buffer may retain one frame, every successive frame, a subsampling of successive frames, or may only store a certain number of successive frames for periodic analysis. The frame buffer may be implemented by any of a number of means including separate hardware or as a designated part of computer memory.

At step 50, one or more "video quality features" are calculated with respect to each frame of video data. The term "video quality features" is used generally to refer to both the background features described with respect to FIG. 2, as well as other features used to assess the quality of the video data provided to video recognition system 14. In particular, the features calculated at step 50 characterize aspects of video quality such as signal strength, noise, signal to noise ratio, on-line computable video quality metrics such as those used to detect compression artifacts, lighting sufficiency, saturation, video detector shaking or movement, video detector focus, video detector alignment, and other features associated with video quality.

In an exemplary embodiment, one or more of the video quality features calculated upon installation of the video-based fire detection system or during operation of the video-based fire detections system are stored to memory or a buffer, as shown at step 52. The stored video quality features are used as a benchmark with which to compare video quality features calculated with respect to subsequent frames of video data.

At step 54, the video quality features are assessed by decisional logic to detect video quality degradation that would affect the ability of video-based fire detection system 10 to detect the presence of fire. For example, decisional logic analyzes the video quality features calculated at step 50 to detect conditions such as excessive noise, presence of compression artifacts, insufficient lighting, over saturation, shaking of the video detector, out-of-focus, misalignment, loss of contrast, and loss of video input. Part of the analysis related to video quality degradation may include distinguishing between video quality degradation and situations indicative of fire. In an exemplary embodiment, slow changes brought on by video quality degradation are distinguished from sudden changes (typically associated with the propagation of fire) by storing video quality features over time to detect gradual changes in the features. For example, the loss of edge data associated with an out-of-focus video detector may be mistakenly classified as indicative of smoke. However, by storing and comparing video quality features associated with out-of-focus over defined intervals, the gradual or slow progression of the video detector from being in-focus to out-of-focus can be used by decisional logic to distinguish between a video quality problem and the presence of a fire.

In an exemplary embodiment, the decisional logic employed at step 54 is a fuzzy-based inference system that compares the calculated video quality features to thresholds or constraints to detect video quality degradation that affects the ability of video-based fire detection system 10 to detect the presence of fire. In other embodiments, the decisional logic also employs the stored video quality metrics (e.g., baseline video quality metrics stored at installation of the system, video quality metrics calculated at defined intervals) to detect gradual changes in the quality of the video data indicative of video quality degradation.

In another exemplary embodiment, video-quality metrics calculated during installation (e.g., at a time which video-quality is typically considered sufficient for detection of fire) is used to generate a target-based distribution. In an exemplary embodiment, the target-based distribution is generated by dividing an image (e.g., an image captured during installation) into discrete sub-images. For example, the image may be divided into a 3×3 grid of equally sized sub-images. A distribution associated with the video-quality feature(s) is calculated for each sub-image, and the collection of distributions defines the target-based distribution. In this way, the target-based distribution represents a benchmark that can be used to gauge the video-quality of subsequent frames of video data.

A similar distribution is calculated as part of the video-quality metrics calculated at step 50 with respect to a current frame of video data. For example, the current frame of video data may be divided into a plurality of sub-images (e.g., a grid of 3×3 equally sized sub-images) and a distribution can be generated with respect to each sub-image based on one or more video-quality features. Decisional logic then compares the video quality-based distributions with the target-based distribution. In an exemplary embodiment, an entropy value is calculated based on the comparison of the background-based distribution and the target-based distribution, wherein the entropy represents the difference between the two distributions. In this way, decisional logic can assess the quality, and thus the ability of video-based fire detection system to accurately detect the presence of fire.

At step 56, an output is generated in response to the analysis performed at steps 50 and 54. In an exemplary embodiment, the output may be a binary output indicating, based on the calculated video-quality features, whether video quality degradation has affected the ability of video-based fire detection system to detect the presence of fires. In this embodiment, the output automatically triggers video quality alarm 18 (as shown in FIG. 1), alerting a supervisor or others of the detected video quality degradation. In other embodiments, additional information including the type of video quality problems detected or specific values associated with the calculated video quality features may be provided along with the triggering of the video quality alarm. In another example, the output is real valued and represents the certainty of the ability of video recognition system 14 to detect the presence of fire.

In this way, the present invention provides a system and method for assessing the capability or ability of a video-based fire detection system to detect the presence of fire. This includes assessing environment factors (such as lack of color edge information, etc. in the background) as well as video quality problems (such as out-of-focus conditions, camera shaking, etc.) that may prevent video-based fire detection system from accurately detecting the presence of fire. In this way, the present invention is able to assess the ability of video-based fire detection system to detect the presence of fires. Although the present invention has been described with reference to preferred embodiments, workers skilled in the art will recognize that changes may be made in form and detail without departing from the spirit and scope of the invention.

The invention claimed is:

1. A method of initializing a video-based fire detection system to detect the presence of fire, the method comprising:
   acquiring video data comprised of individual frames from a video detector;
   calculating background features associated with one or more of the individual frames;
   assessing the ability of the video-based fire detection system to detect the presence of fire based on the calculated background features; and
   generating an output indicating the ability of video-based fire detection system to detect the presence of fire.

2. The method of claim 1, wherein calculating background features includes:
   calculating an edge-based feature that characterizes the edge content of the individual frame.

3. The method of claim 2, wherein assessing the ability of the video-based fire detection system to detect the presence of fire based on the calculated background features includes:
   comparing the edge-based feature to a threshold value using decisional logic that determines whether the individual frame contains sufficient edge content to allow the video-based fire detection system to detect the presence of fire.

4. The method of claim 1, wherein calculating background features includes:
   calculating a color-based feature that characterizes the color content of the individual frame.

5. The method of claim 4, wherein assessing the ability of the video-based fire detection system to detect the presence of fire based on the calculated background features includes:
   comparing the color-based feature to a threshold value using decisional logic that determines whether the individual frame contains sufficient color content to allow the video-based fire detection system to detect the presence of fire.

6. The method of claim 1, wherein calculating background features includes calculating background features selected from the group consisting of: a color-based feature, a spatial frequency feature, an edge-based feature, a motion-based feature, an illumination feature, a contrast feature, and combinations thereof.

7. The method of claim 1, wherein generating an output indicating the ability of video-based fire detection system to detect the presence of fire includes:
   displaying an image that indicates visually the assessed ability of the video-based fire detection system to detect the presence of fire with respect to areas defined within the field of view of the video detector.

8. The method of claim 1, wherein generating an output includes:
   generating a recommendation regarding steps to improve the assessed ability of the video-based fire detection system to detect the presence of fire.

9. The method of claim 1, wherein generating an output includes:
   generating a real-valued output indicating a confidence level associated with the assessed ability of the video-based fire detection system to detect the presence of fire.

10. A method of monitoring an ability of a video-based fire detection system to detect the presence of fire, the method comprising:
    calculating video-quality features associated with individual frames during operation of the video-based fire detection system;
    detecting video quality degradation that adversely affects the ability of video-based fire detection system to detect the presence of fire based on the calculated video quality features; and
    generating an output indicating the ability of the video-based fire detection system to detect the presence of fire based on the detected video quality degradation.

11. The method of claim 10, further including:
    calculating video-quality features during installation of the video-based fire detections system; and
    storing the video-quality features calculating during installation, wherein detecting video quality degradation includes comparing the video-quality features calculated during operation of the video-based fire detection system to the stored video-quality features calculated during installation to determine whether the detected degradation of video quality adversely affects the ability of the video-based fired detection system to detect the present of fire.

12. The method of claim 11, wherein calculating video-quality features includes generating a distribution with respect to each video-quality feature and wherein calculating video-quality features during installation includes calculating a target spatial distribution comprised of equally-sized sub-images defined by a uniform distribution, and wherein detecting video quality degradation includes comparing the distributions calculated with respect to each video-quality feature to the target-spatial distribution.

13. The method of claim 10, wherein calculating video-quality features includes calculating a plurality of video-quality features over a defined interval, and wherein detecting video quality degradation that adversely affects the ability of video-based fire detection system to detect the presence of fire includes distinguishing between video-quality degradation and a fire-based event based on the plurality of video-quality features calculated over the defined interval.

14. A video-based fire detection system comprising:
inputs operably connectable to receive video data comprised of a plurality of individual frames from one or more video detectors;
a video recognition system connectable to receive the video data and to provide an output assessing the ability of the video recognition system to detect the presence of fire, wherein the video recognition system is operable to calculate background features associated with each individual frame, and to assess the ability of the video-based fire detection system to detect the presence of fire based on the calculated background features; and
outputs operably connectable to communicate the assessed ability of the video recognition system to detect the presence of fire.

15. The video-based fire detection system of claim 14, wherein the background features calculated by the video recognition system includes at least one feature selected from the group consisting of: a color-based feature, a spatial frequency feature, an edge-based feature, a motion-based feature, an illumination feature, a contrast feature, and combinations thereof.

16. The video-based fire detection system of claim 14, wherein the output generated by the video recognition system includes a visual display that illustrates the assessed ability of the video recognition system to detect the presence of fire with respect to areas within the field of view of the video detector.

17. The video-based fire detection system of claim 14, wherein the video recognition system is operable to calculate video-quality features associated with each individual frame, wherein the video-recognition system detects degradation in the quality of video provided by the video detectors that would adversely affect the ability of the video recognition system to detect the presence of fire.

18. The video-based fire detection system of claim 17, wherein the output generated by the video recognition system is a notification that indicates the assessed ability of the video-based fire detection system to detect the presence of fire has been reduced.

* * * * *